(12) United States Patent
Pfeifle et al.

(10) Patent No.: US 8,756,261 B2
(45) Date of Patent: Jun. 17, 2014

(54) METHOD AND SYSTEM FOR HANDLING BINARY LARGE OBJECTS

(75) Inventors: Martin Pfeifle, Seewald (DE); Jan Richter, Idstein (DE)

(73) Assignee: Navteq B.V., Veldhoven (NL)

( * ) Notice: Subject to any disclaimer, the term of this patent is extended or adjusted under 35 U.S.C. 154(b) by 210 days.

(21) Appl. No.: 12/833,068

(22) Filed: Jul. 9, 2010

(65) Prior Publication Data

US 2012/0011178 A1    Jan. 12, 2012

(51) Int. Cl.
*G06F 17/30* (2006.01)
(52) U.S. Cl.
USPC ............................................. 707/825
(58) Field of Classification Search
USPC ............................................. 707/825
See application file for complete search history.

(56) References Cited

U.S. PATENT DOCUMENTS 6,615,219 B1 *   9/2003   Bruso et al. .................... 707/699
7,440,957 B1 * 10/2008   Kotidis et al. ......................... 1/1
2009/0030606 A1    1/2009   Pfeifle et al. ................... 701/209
2009/0276456 A1 * 11/2009   Neubacher et al. ....... 707/103 R
2010/0094804 A1    4/2010   Pfeifle et al. ................... 707/609

FOREIGN PATENT DOCUMENTS

EP          1898301        8/2007    ............... G06F 3/06
WO    WO 2007/088088      8/2007    ............. G01C 21/32

OTHER PUBLICATIONS

Oracle, Oracle8 Image Cartridge User's Guide, Nov. 1997, Release 8.0.4, 84 pages.*

* cited by examiner

*Primary Examiner* — Rehana Perveen
*Assistant Examiner* — Alexander Khong
(74) *Attorney, Agent, or Firm* — Lempia Summerfield Katz LLC

(57) ABSTRACT

A method and system for efficiently storing, retrieving, and updating binary large objects (BLOBs) in embedded systems is disclosed. The metadata of the BLOBs is stored in relational tables, while the BLOBs are stored in a flat file. Querying the metadata of the BLOBs (i.e. the starting points of the BLOBs and their length) is performed based on SQL. The corresponding BLOBs are then accessed using file operation commands. To further simplify the querying and storage of BLOBs, virtual tables are created. By using these virtual tables, a user can access a BLOB as if it was stored in a physical table.

16 Claims, 4 Drawing Sheets

METHOD AND SYSTEM FOR HANDLING BINARY LARGE OBJECTS

FIELD

The present invention relates generally to binary large objects (BLOBs), and more particularly, relates to efficiently storing, retrieving, and updating BLOBs in embedded systems.

BACKGROUND

A Binary Large Object (BLOB) is a collection of binary data stored as a single entity. BLOBs typically contain image, audio, or other multimedia data. Navigation system vendors may also store map data in BLOBs.

The Navigation Data Standard (NDS) describes storing map data in a relational database. The relational database includes one or more tables that include an identifier, attributes, and a BLOB for each record in the table. Using relational databases to store BLOBs has the advantage of simplifying data access by using Structured Query Language (SQL). SQL is a database computer language designed for managing data in relational database management systems (RDBMS).

Unfortunately, relational databases are not optimized for handling BLOBs. As a result, storage space may be wasted and retrieval of the BLOBs may require several seek operations. These deficiencies are particularly a problem in embedded systems with high performance requirements and size limitations. An embedded system is a computer system designed to perform one or a few dedicated functions often with real-time computing constraints. Embedded systems include mobile telephones, personal digital assistants (PDAs), mp3 players, videogame consoles, digital cameras, DVD players, GPS receivers, navigation systems, printers, and so on.

Therefore, it would be beneficial to maintain the advantages of using relational databases (e.g., convenient query language), while improving the handling efficiency of the BLOBs, especially in embedded systems.

SUMMARY

A method and system for efficiently storing, retrieving, and updating BLOBs in embedded systems is disclosed. A database system includes a virtual table and a module. A user identifies BLOBs in the virtual table and, the module stores the BLOBs in a flat file and stores the data needed to access the BLOBs in a relational database. The data needed to access the BLOBs includes a starting point and a length. The starting point identifies a memory address in the flat file where the BLOB begins. The length identifies the size of the BLOB, typically in bytes. To retrieve a BLOB, the module finds the starting point and the length of the BLOB in the relational database, and then performs a single seek and read operation on the flat file. As a result, a user of the database system can query and update the BLOBs using SQL as if the BLOBs were stored in a relational database table.

By using the virtual table, the method and system for handling BLOBs combine the best of the SQL-world, i.e., convenient data access and updatability, with the best of the flat file world, i.e., time and space efficiency. These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
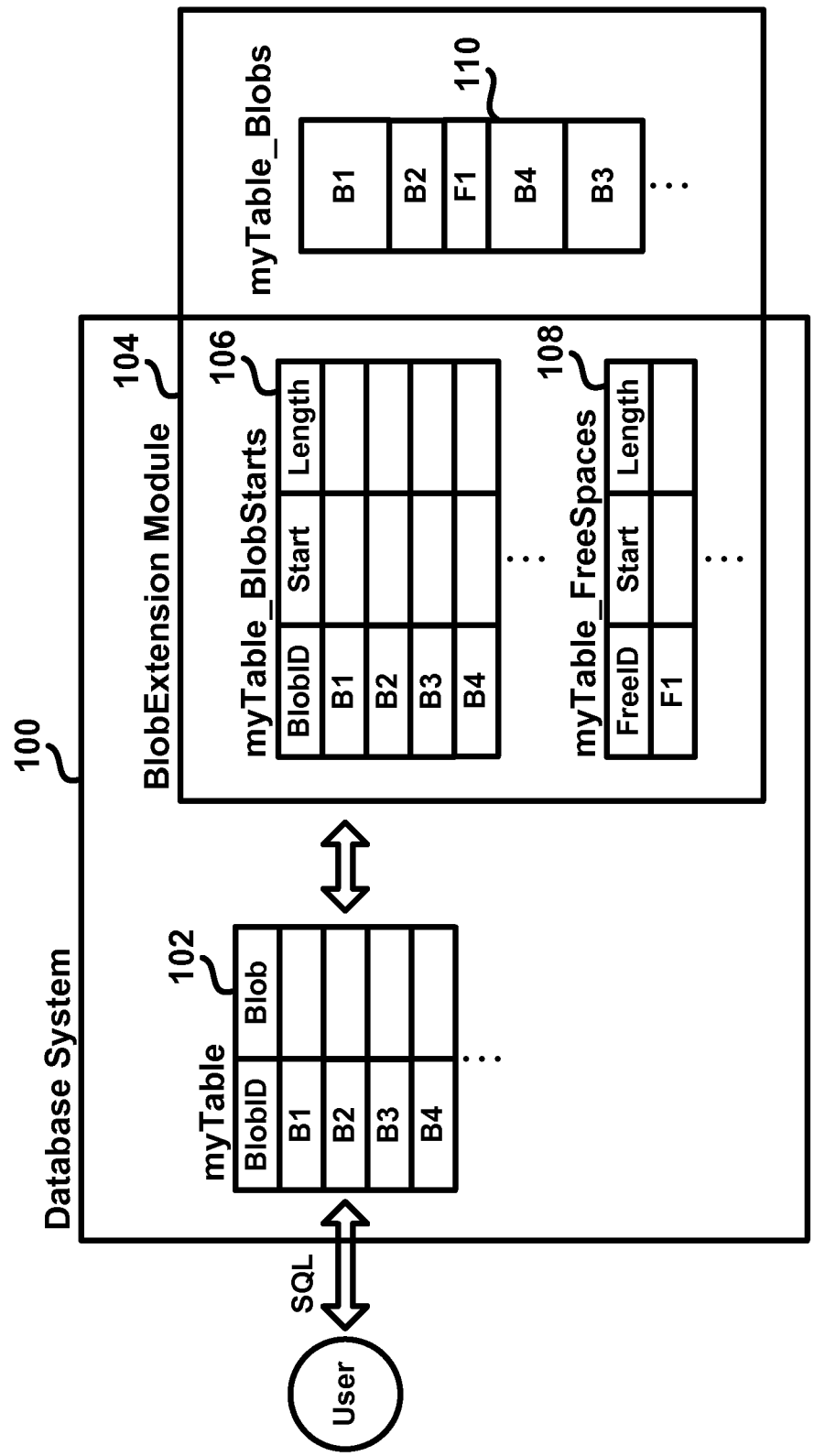
FIG. 1 is a block diagram of a database system, according to an example.

FIG. 1 is a block diagram of a database system 100. The database system 100 is a relational database management system (RDBMS). While the following description uses the example of SQLite, other RDBMSs, such as Postgres, may be used. As shown in FIG. 1, the database system 100 includes a virtual table 102 identified as "myTable." A virtual table is an object that is registered with an open SQLite database connection. SQLite is a software library that implements a self-contained, serverless, zero-configuration, transactional SQL database engine. From the perspective of an SQL statement, a virtual table object looks like any other table or view, but behind the scenes, queries from and updates to a virtual table invoke callback methods on the virtual table object instead of reading and writing to the database file. The virtual table mechanism allows an application to publish interfaces that are accessible from SQL statements as if they were tables.

A user of the database system 100 creates the virtual table 102 using a database specific syntax. The user of the database system 100 may be the navigation system software, the navigation map compiler software, or a graphical user interface (GUI) depicting the content of the database. The user of the database system 100 may also be a person using the navigation system or the GUI. For creating the virtual tables and storing the BLOBs in these tables, the user is normally the map compiler, whereas for reading the BLOBs, the user is typically the navigation system.

For example, a user using SQLite may create a virtual table using the syntax:

CREATE TABLE myTable (id, data) USING BlobExtension.

This statement creates a table with the name "myTable" and associates the table with the module named "BlobExtension." The contents of the virtual table 102 include BLOB identifiers (BlobID) and associated BLOBs. BlobID is a primary key. The primary key of a relational table uniquely identifies each record in the table.

The BLOB may include geographic data. For example, the embedded system may be a navigation system that retrieves a BLOB to obtain the geographic data for map display, route calculation, and/or route guidance. The geographic data contains data that represents the road network in the region, such as the locations (geographic coordinates, including altitude) of roads and intersections, road names, speed limits along roads, turn restrictions at intersections, addresses or address ranges along roads, the number of lanes each road has, lane width, lane markings, functional classes of roads, the locations of medians, and so on. The geographic data may also contain information about other geographic features, such as bodies of water, parks, administrative areas (including municipal, state, and country boundaries), and locations of points of interest, such as businesses, hospitals, police stations, and so on.

As shown in FIG. 1, the database system 100 also includes a BlobExtension module 104. The module 104 contains instructions that are invoked by SQLite to perform various actions on the virtual table 102. The module 104 creates two physical tables (as opposed to a virtual table), myTable_BlobStarts 106 and myTable_FreeSpaces 108, which are initially empty.

The module 104 also creates an initially empty file, myTable_BLOBs 110, for storing the BLOBs. The file 110 is a flat file, meaning that it is a data file that is not related to and does not contain linkages to another file. The flat file 110 is stored externally from the database system 100 as shown in FIG. 1 so that it can be accessed directly via file-system commands. If the file 110 was stored within the database system 100, retrieving BLOBs in SQLite may become time consuming because the SQLite library may require several seek operations on the file system for the BLOB. Additionally, storing the file 110 was stored within the database system 100 may also waste disk space.

The myTable_BlobStarts table 106 includes the BlobID corresponding to the identifier in the virtual table 102, a starting memory address of the associated BLOB in the file 110, and the length of the BLOB in bytes. For example, the byte length can be determined using the command "int sqlite3_blob_bytes(sqlite3_blob*)" as described at http://www.sqlite.org/c3ref/blob_bytes.html.

If the user inserts a record into the virtual table 102 by using a command similar to:

INSERT INTO myTable VALUES (1, 0x'F3AB3 ... 2D')
the module 104 stores the BLOB (i.e., the data stream 0x'F3AB3 ... 2D') having the BLOB identifier of "1" at the beginning of the file 110. Additionally, the module 104 stores the starting point of the BLOB (i.e., in this example zero) and the length of the BLOB in bytes in the first row of the myTable_BlobStarts table 106. If further records are inserted into the virtual table 102, the module 104 appends the BLOBs after each other in the file 110 and stores the starting points and lengths in the myTable_BlobStarts table 106. For example, as shown in FIG. 1, the BLOB having the identifier of "2" is appended in the file 110 after the BLOB having the identifier of "1."

When a user wants to retrieve data, the user provides commands to the virtual table 104 as if the user was providing commands to a physical table. For example, the user could issue the following query:

SELECT Blob FROM myTable WHERE BlobID BETWEEN 2 AND 10.

In response to this example query, the database system 100 communicates with the BlobExtension module 104 via interfaces provided by the database system 100 to retrieve the data. A description of the interfaces for SQLite may be found at http://www.sqlite.org/cvstrac/wiki?p=VirtualTables. The BlobExtension module 104 performs the following query:

SELECT*FROM myTable_BlobStarts WHERE BlobID BETWEEN 2 AND 10.

The module 104 uses the BlobID to retrieve the relevant BLOBs from the myTable_Blobs file 110 by using standard file operations like fopen, fseek, and fread.

In addition to retrieving data, a user may want to update the data in the BLOB. A data update may increase the length of the BLOB in the myTable_Blobs file 110. If this occurs, the BLOB cannot be stored at its original position within the file 110 as it may overwrite other BLOBs stored in the file 110. The myTable_FreeSpaces table 108 is used to optimize the movement of BLOB within the file 110.

If the myTable_FreeSpaces table 108 is empty, the updated BLOB is moved to the end of the myTable_Blobs file 110. Additionally, the starting point and the length of the BLOB are updated in the myTable_BlobStarts table 106. In addition, the length and starting position of the resulting gap where the BLOB was formally located are stored in the myTable_FreeSpaces table 108. For example, as shown in FIG. 1, the BLOB having the identifier of "3" is appended to the end of the file 110 resulting in the free space having the identifier of "1" in the file 110.

The free spaces identified in the myTable_FreeSpaces table 108 can be reused. If a user enters a new record into the virtual table 102 that is smaller than an existing free space, the module 104 may store the new record in this gap. In order to decide whether an existing gap can be reused, the BlobExtension module 104 issues a query similar to:

SELECT * FROM myTable_FreeSpaces WHERE
length >= length(BlobToBeInserted).

If this query returns more than one result, the module 104 chooses an appropriate gap, inserts the BLOB into this gap, and updates the start and length information in both of the myTable_BlobStarts table 106 and myTable_FreeSpaces table 108. Another example query is:

SELECT * FROM myTable_FreeSpaces WHERE
length >= length(BlobToBeInserted) ORDER BY Length LIMIT 1.

This query selects the smallest possible gap that is still big enough to store the complete BLOB. There are other strategies that may also be used for optimal organization of BLOBs in the file 110.

The module 104 can use gaps identified in the myTable_FreeSpaces table 108 for updating existing records in a similar manner as described for inserting new records. If an updated BLOB no longer fits into its original position, rather than appending it to the end of the file 110, the module 104 may use an existing gap by querying the myTable_FreeSpaces table 108. As a result of using gaps for both new and updated records, the size of the file 110 is minimized.

The database system 100, including the table 102 and the module 104, are stored in main memory. The myTable_BlobStarts table 106, the myTable_FreeSpaces table 108, and the myTable_Blobs file 110 are stored in secondary storage. The secondary storage may be a hard drive, a CD or DVD drive, a flash drive, or any other suitable memory device. A processor in the embedded system is able to read data from and write data to the secondary storage using program instructions similar to those described herein.

Alternative Embodiments

Figure 2:
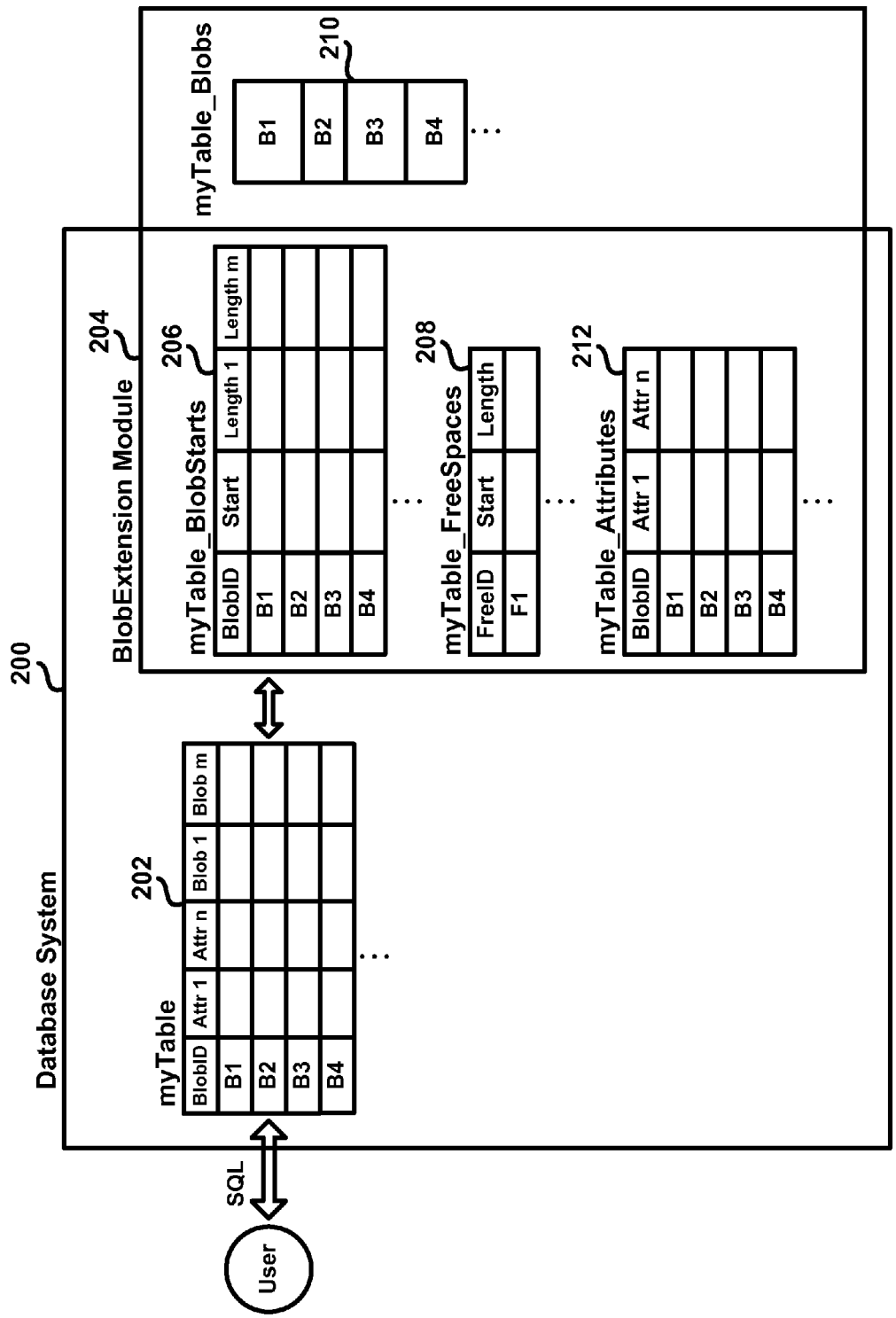
FIG. 2 is a block diagram of a database system, according to another example.

FIG. 2 shows that the system and method for handling BLOBs can be extended to handle attributes and/or several BLOBs. For example, a user may create a virtual table using the syntax:

myTable (ID, Attr1, ... , Attrn, Blob1, ... , Blobm).

In this example, the BlobExtension module 204 creates an additional physical table myTable_Attributes 212, which stores attributes of a record. In the example of a BLOB containing map data, the attributes may include map vendor identifier, map version identifier, geographic area identifier, parcel number, and so on.

While the myTable_FreeSpaces table 208 is formatted in a similar manner as the myTable_FreeSpaces table 108, the module 204 may add additional columns in the myTable_BlobStarts table 206. There are at least two different ways to format the myTable_BlobStarts table 206. In one example, the table 206 may have the format myTable_BlobStarts (BlobId, Start, Length1, . . . , Lengthm) as shown in FIG. 2.

The BlobExtension module 204 uses a single start pointer for all BLOBs of a certain row. With only a single pointer, the BLOBs of this row are stored sequentially (without free space) in the myTable_Blobs file 210. If a user enters a command like:

SELECT BLOB3 FROM myTable WHERE BlobID=4711, the BlobExtension module 204 computes the starting point of BLOB3 by adding the length of BLOB1 and BLOB2 to the start attribute.

Figure 3:
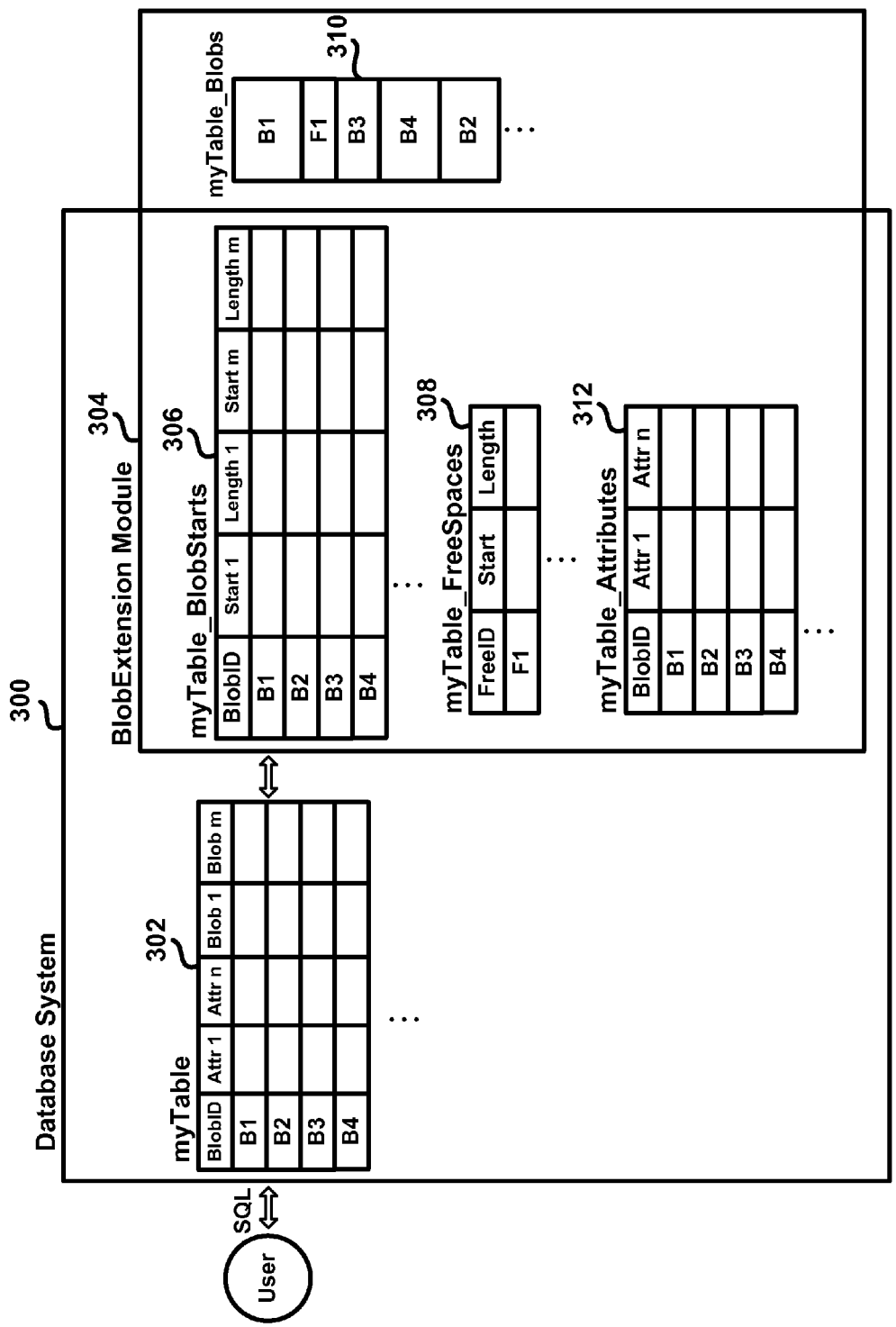
FIG. 3 is a block diagram of a database system, according to another example.

In another example, the myTable_BlobStarts table 306 may have the format myTable_BlobStarts (BlobId, Start1, Length1, . . . , Startm, Lengthm) as shown in FIG. 3. In this example, the BLOBs of one row do not have to be stored sequentially in the myTable_Blobs file 310. Instead, the BLOBs of one row may be scattered within the file 310. The BlobExtension module 304 derives the starting position of each BLOB using the myTable_BlobStarts table 306.

With the format of the myTable_Blobs table 306, the module 304 can cluster the BLOBs of a certain column. As a result, the module 304 may be more efficient than the module 204 for processing queries like:

SELECT Blob3 FROM myTable.

However, the module 204 may be more efficient than the module 304 for processing queries like:

SELECT*FROM myTable.

This is because the module 204 only has to carry out one seek operation in the file myTable_Blobs 206, whereas the module 304 has to carry out m seek operations in the file myTable_Blobs 306.

Data Compression

The BLOBs stored in the myTable_Blobs file 110 may be stored in a compressed or uncompressed format. Compression and decompression is done outside the BlobExtension module 104. The module 104 performs appropriate queries based on a query from a user. For example, if the BLOBs are stored compressed, the user may issue commands like:

SELECT decompression(BLOB) FROM myTable

Whether a BLOB is stored compressed or uncompressed may be indicated by an additional column in the virtual table 102 (i.e., as an attribute as shown in FIGS. 2 and 3). For example, the virtual table 102 may have the format (BlobID, CompressionType, BLOB). In this example, the user may issue a query like:

SELECT decompression(BLOB, CompressionType) FROM myTable

In the user defined function "decompression," the BLOB is then decompressed with the appropriate algorithm (e.g., zlib, bzip2). If the BLOB is not stored compressed, the BLOB may not undergo decompression despite the query.

VACCUM Command

Many database systems support a VACCUM command that reorganizes a database. This command may be propagated to the BlobExtension module 104. The module 104 orders BLOBs one after the other and removes all free spaces between them, which minimizes the size of the myTable_Blobs file 110. After applying the VACCUM command, the BlobExtension module 104 also updates the myTable_BlobStarts table 106 and empties the myTable_FreeSpaces table 108.

Free Space

As previously described, a data update may increase the length of the BLOB requiring the BLOB to be moved to another location in the myTable_Blobs file 110. In order to reduce the number of BLOB movements within the file 110, a gap may intentionally be placed between BLOBs stored in the file 110 providing a limited amount of growth space. For example, a user creating the virtual table 102 may command the module 104 to append 10% of the BLOB size to the BLOB as free space using the command:

CREATE TABLE myTable BblobID,Blob, USING BlobExtension (Free=10)

The BlobExtension module 104 may store the percentage free value in the myTable_Attributes table 212 or another table. If a BLOB is only slightly changed during an update, the BLOB may be able to stay at its current position without overwriting the next BLOB in the file 110. If this is the case, the BlobExtension module 104 updates the length attribute, but not the start attribute, in the myTable_BlobStarts table 106. The module 104 does not need to update the myTable_FreeSpaces table 108 as this gap is accounted for in the myTable_BlobStarts table 106. Note that after several updates, the myTable_Blobs file 110 using a percentage free value may be smaller than if myTable_Blobs file 110 does not intentionally place gaps between BLOBs.

Transaction Security

A user can carry out some change commands on the virtual table 102 within one transaction. If the user rolls back the transaction, the changes in the myTable_BlobStarts table 106 and the myTable_FreeSpaces table 108, as well as the changes in the myTable_Blobs file 110 should also be rolled back. The database system 100 automatically rolls back the changes in the myTable_BlobStarts table 106 and the myTable_FreeSpaces table 108. For the myTable_Blobs file 110, the BlobExtension module 104 rolls back the changes. To do this, the module 104 creates a journal file that contains changed parts of the file 110. Based on the information in the journal file, the BlobExtension module 104 reconstructs the original content of the myTable_Blobs file 110 if a transaction is aborted.

Embedded System Example

Figure 4:
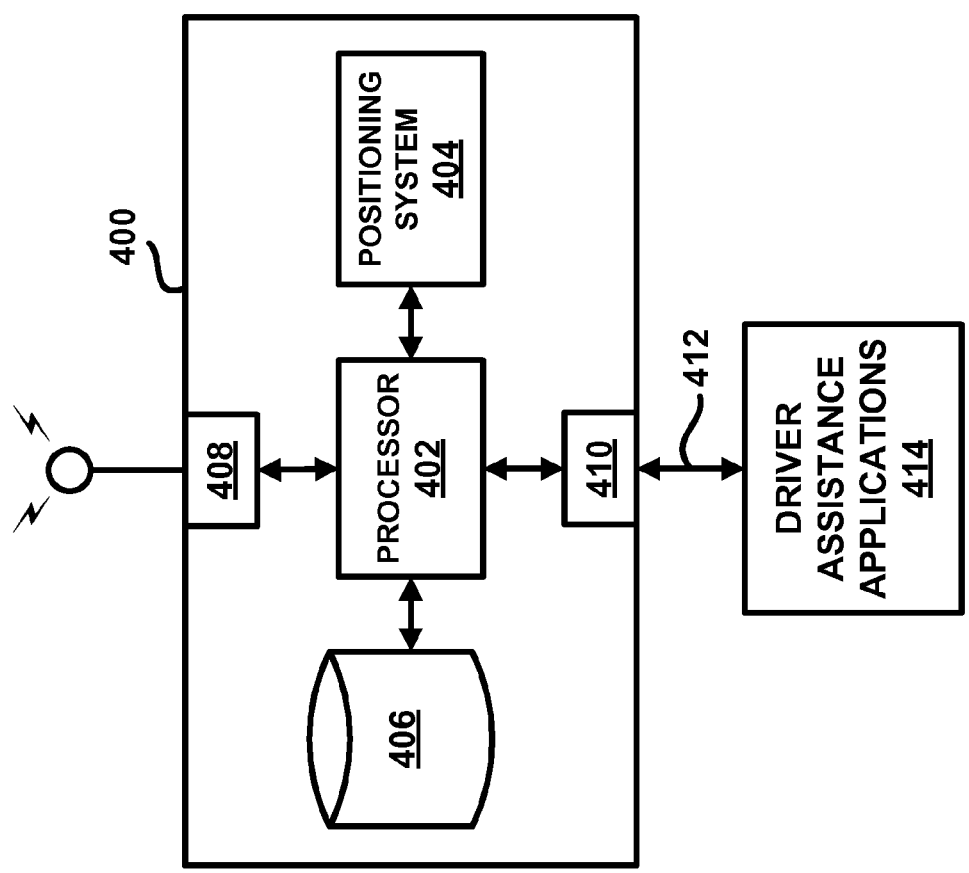
FIG. 4 is a block diagram of an example embedded system using the database system depicted in FIG. 1.

FIG. 4 is a block diagram of a map and positioning engine (MPE) 400. The MPE 400 enables map-enhanced Advanced Driver Assistance Systems (ADAS) in vehicles that do not have an in-vehicle navigation system. ADAS includes adaptive headlight aiming, adaptive cruise control, lane departure warning and control, curve warning, speed limit notification, hazard warning, predictive cruise control, and adaptive shift control, as well as others. The MPE 400 includes a processor 402, a positioning system 404, data storage 406, a communication system 408, and an in-vehicle data bus interface 410. The MPE 400 may also include other hardware, software, and/or firmware.

The processor 402 may be any type of processor, controller, or other computing device. For example, the processor 402 may be a digital signal processor. The processor 402 receives inputs from the positioning system 404, the data storage 406, the communication system 408, the in-vehicle data bus interface 410, and other sources. The processor 402 then processes the inputs using application software programs, such as a map access application, a map update application, a vehicle positioning application, and an electronic horizon application.

The processor 402 then provides outputs to driver assistance applications 414 via the in-vehicle data bus interface 410 and a data bus 412. Preferably, the in-vehicle data bus interface 410 and the data bus 412 are a Controller-Area Network (CAN) interface and a CAN-bus, which are designed for automotive applications. The driver assistance applications 414 may include adaptive headlight aiming, adaptive cruise control, obstruction detection, obstruction avoidance, collision avoidance, adaptive shift control, and others.

The positioning system 404 may utilize GPS-type technology, a dead reckoning-type system, or combinations of these or other systems, all of which are known in the art. The positioning system 404 may also include suitable sensing devices that measure the traveling distance speed, direction, orientation, and so on. For example, the positioning system 404 may include a GPS system and a gyroscope. The positioning system 404 provides an output signal to the processor 402. Some of the application software programs that run on the processor 402 use the output signal from the positioning system 404 to determine the location, direction, orientation, etc., of the MPE 400.

The data storage 406 includes the database system 100 and geographic data stored as BLOBs in the file 110. The geographic data includes data providing the geographic coordinates (e.g., the latitude, longitude, altitude) of endpoints of represented road segments and data providing the shape of the road segments. The geographic data may be more accurate than the data typically contained in a navigation system geographic database. The geographic data may also include more kinds of data than the data typically contained in a navigation system geographic database, such as data about road objects, such as signs and crosswalks, including their positions along a road segment, sign object type, and sign text.

The geographic data may be organized into parcels, which are then stored as BLOBs in the data storage 406. A parcel is the smallest unit of the geographic data that can be replaced or updated in the data storage 406. Initially, the MPE 400 manufacture loads the geographic data in the MPE 400 by creating the virtual table 102 using a BLOB identifier and a data stream that includes the geographic data for each parcel. The module 104 creates the tables 106, 108 and the file 110. The module 104 then adds the BLOBs containing the parcel data into the file 110 and updates the table 106 to identify the start location and the length of each of the BLOBs. During vehicle operation, the processor 402 retrieves data from the BLOBs as needed.

The parcels may be updated using the communications system 408. A parcel may be updated independently of the other parcels. The communications system 408 preferably receives the new or updated parcels over a wireless communications link. Any wireless communications system, including cellular, PCS, satellite, FM, radio, or technologies that may be developed in the future, may be used to transmit new or updated parcels to the communications system 408. The module 104 updates and re-organizes the BLOBs as previously described using the tables 106, 108 and the file 110.

By storing the metadata describing access information in a relational database and the BLOBs in a flat file, the MPE 400 is able to quickly access and update BLOBs containing geographic data using a convenient query language.

It is intended that the foregoing detailed description be regarded as illustrative rather than limiting and that it is understood that the following claims including all equivalents are intended to define the scope of the invention. For example, while the description provided examples using SQL and SQLite it is understood that other languages and database management systems may be used. The claims should not be read as limited to the described order or elements unless stated to that effect. Therefore, all embodiments that come within the scope and spirit of the following claims and equivalents thereto are claimed as the invention.

We claim:

1. A computer-implemented method of storing a binary large object in an embedded system, comprising:
   receiving a binary large object and an identifier associated with the binary large object by a database system;
   storing the binary large object in a flat file external from the database system starting at a position in memory and extending to a length of the binary large object;
   storing the identifier, the length, and the position in a relational table within the database system;
   creating a virtual table operative to allow a user of the database system to identify and update data within the binary large object as if the binary large object were stored in the relational table rather than external from the database by receiving a command from the user to update the binary large object, the database system, responsive to the receipt of the command from the user by the virtual table, being further operative to update the binary large object;
   updating the binary large object responsive to the received command; and
   moving the binary large object to a second position in the flat file and updating the length and the position in the relational table when updating the binary large object increases the length of the binary large object.

2. The method of claim 1, wherein the virtual table allows the user of the database system to retrieve the binary large object.

3. The method of claim 1, wherein the binary large object includes geographic data.

4. The method of claim 1, further comprising retrieving, at the request of the user, the binary large object by receiving, by the virtual table, a query from the user, the database system, responsive to the query received by the virtual table from the user, querying the relational table and using file operations to read the binary large object from the flat file.

5. The method of claim 1, further comprising creating a second relational table within the database system and storing the length and the position of the binary large object prior to the update and the move in the second relational table.

6. The method of claim 5, further comprising storing a second binary large object starting at the position identified in the second relational table.

7. The method of claim 1, further comprising compressing the binary large object prior to storing the binary large object in the flat file.

8. The method of claim 7, further comprising decompressing the binary large object after retrieving the compressed binary large object from the flat file.

9. The method of claim 1, adding a gap in the flat file after storing the binary large object and prior to storing a second binary large object.

10. A computer-implemented method of handling a binary large object in an embedded system, comprising:
    creating a virtual table operative to allow a user to identify and update data within a binary large object, as if the binary large object were stored in the relational table rather than external from a database system by receiving a command from the user to update the data within the binary large object, the database system, responsive to the receipt of the command from the user by the virtual table, being further operative to update the data within the binary large object, and an associated identifier to the database system, wherein the virtual table is associated with a module that contains instructions to perform actions on the virtual table;

receiving an instruction to insert the binary large object and the identifier associated with the binary large object in the virtual table;

the module storing the binary large object in a flat file external from the database system starting at a position in memory and extending to the length of the binary large object;

the module storing the identifier, the length, and the position in a relational table within the database system;

the module updating the binary large object responsive to the received command; and the module moving the binary large object to a second position in the flat file and updating the length and the position in the relational table when updating the binary large object increases the length of the binary large object.

11. A system for storing a binary large object in an embedded system, comprising in combination:

a memory;

a database system, stored in the memory, including a virtual table and a module that includes at least one physical table; and a flat file, stored in a secondary memory external to the memory in which the database system is stored, that includes binary large objects that can be retrieved and data contained therein updated by a user querying and updating the virtual table and using metadata stored in the at least one physical table and wherein the database system, responsive to the receipt of the querying and updating from the user by the virtual table, being further operative to update the data within the binary large object and move the binary large object to a second position in the flat file and updating the length and the position in the relational table when updating the binary large object increases the length of the binary large object.

12. The system of claim 11, wherein the virtual table includes a binary large object and an identifier associated with the binary large object.

13. The system of claim 11, wherein the metadata identifies start and length of the binary large object stored in the flat file.

14. The system of claim 11, wherein the metadata identifies free spaces in the flat file.

15. The system of claim 11, wherein the metadata identifies attributes of the binary large objects.

16. The system of claim 11, wherein the binary large objects include geographic data.

* * * * *